US010154657B2

United States Patent
Grajcar et al.

(10) Patent No.: US 10,154,657 B2
(45) Date of Patent: Dec. 18, 2018

(54) LIGHTING SYSTEM AND CONTROL FOR AQUACULTURE

(71) Applicant: Once Innovations, Inc., Plymouth, MN (US)

(72) Inventors: Zdenko Grajcar, Orono, MN (US); Juliette Delabbio, Natchitoches, LA (US)

(73) Assignee: Once Innovations, Inc., Plymouth, MN (US)

( * ) Notice: Subject to any disclaimer, the term of this patent is extended or adjusted under 35 U.S.C. 154(b) by 0 days.

(21) Appl. No.: 15/418,873

(22) Filed: Jan. 30, 2017

(65) Prior Publication Data

US 2017/0135325 A1    May 18, 2017

Related U.S. Application Data

(63) Continuation of application No. 14/820,588, filed on Aug. 7, 2015, now Pat. No. 9,554,562.
(Continued)

(51) Int. Cl.
*A01K 63/06* (2006.01)
*F21V 31/00* (2006.01)
(Continued)

(52) U.S. Cl.
CPC ............ *A01K 63/06* (2013.01); *A01K 63/006* (2013.01); *F21V 23/005* (2013.01);
(Continued)

(58) Field of Classification Search
CPC .... A01K 61/00; A01K 61/006; A01K 63/003; A01K 79/02; A01K 61/007;
(Continued)

(56) References Cited

U.S. PATENT DOCUMENTS

| 2,149,764 A | 3/1939 | Rudolf |
| 2,626,135 A | 1/1953 | Semer |

(Continued)

FOREIGN PATENT DOCUMENTS

| CA | 2331245 | 11/2001 |
| CN | 1042039 | 5/1990 |

(Continued)

OTHER PUBLICATIONS

International Application Serial No. PCT/US2012/069379, International Search Report dated Feb. 25, 2013, 2 pgs.
(Continued)

*Primary Examiner* — Yvonne R Abbott-Lewis

(57) ABSTRACT

A method of experimenting on aquatic life in an indoor facility and lighting assembly for accomplishing the same. The lighting assembly includes a lighting device that emits light at a predetermined wavelength that provides a minimum water penetration depth and is positioned in a manner to provide uniform lighting at the air and water interface within a containment unit housing the aquatic life. The on and off function are also controlled by the lighting assembly to provide a gradual turn on and off to prevent interference of effects of lighting with experimental results.

18 Claims, 7 Drawing Sheets

Related U.S. Application Data

(60) Provisional application No. 62/034,490, filed on Aug. 7, 2014.

(51) Int. Cl.
| | |
|---|---|
| *A01K 63/00* | (2017.01) |
| *F21V 23/00* | (2015.01) |
| *H05B 33/08* | (2006.01) |
| *F21V 29/77* | (2015.01) |
| *F21K 9/66* | (2016.01) |
| *F21K 9/23* | (2016.01) |
| *F21Y 115/10* | (2016.01) |
| *F21W 131/308* | (2006.01) |

(52) U.S. Cl.
CPC ....... *H05B 33/083* (2013.01); *H05B 33/0857* (2013.01); *F21K 9/23* (2016.08); *F21K 9/66* (2016.08); *F21V 29/773* (2015.01); *F21V 31/005* (2013.01); *F21W 2131/308* (2013.01); *F21Y 2115/10* (2016.08)

(58) Field of Classification Search
CPC .... A01K 63/042; A01K 61/005; A01K 61/02; A01K 63/006; A01K 63/045; A01K 63/06; A01K 61/002; A01K 61/008; A01K 63/02; A01K 69/00
USPC ................................ 119/200, 204, 207, 267
See application file for complete search history.

(56) References Cited

U.S. PATENT DOCUMENTS

| | | | |
|---|---|---|---|
| 2,709,984 A | 6/1955 | Marks | |
| 2,824,728 A | 2/1958 | Crawford | |
| 3,130,917 A | 4/1964 | Aghnides | |
| 3,273,865 A | 9/1966 | White | |
| 3,398,186 A | 8/1968 | Schwartz | |
| 3,563,204 A | 2/1971 | Szilagyi | |
| 3,747,904 A | 7/1973 | Gross | |
| 3,828,176 A | 8/1974 | Goldman | |
| 3,916,832 A | 11/1975 | Sweeney | |
| 3,923,660 A | 12/1975 | Kottmeier | |
| 3,939,802 A | 2/1976 | Neff | |
| 3,951,104 A | 4/1976 | Neff | |
| 3,998,186 A | 12/1976 | Hodges | |
| 4,026,805 A | 5/1977 | Fowler | |
| 4,065,386 A | 12/1977 | Rigby | |
| 4,137,869 A | 2/1979 | Kipping | |
| 4,248,707 A | 2/1981 | Granger | |
| 4,253,418 A | 3/1981 | Lockwood | |
| 4,379,437 A | 4/1983 | Knowles | |
| 4,428,837 A | 1/1984 | Kronenberg | |
| 4,645,603 A | 2/1987 | Frankl | |
| 4,699,086 A | 10/1987 | Mori | |
| 4,699,087 A | 10/1987 | Mori | |
| 4,703,719 A | 11/1987 | Mori | |
| 4,716,024 A | 12/1987 | Pera | |
| 4,761,228 A | 8/1988 | Weisenbarger | |
| 5,027,550 A | 7/1991 | Mori | |
| 5,077,932 A | 1/1992 | Hetherington | |
| 5,085,810 A | 2/1992 | Burrows | |
| 5,133,145 A | 7/1992 | McDonald | |
| 5,161,481 A | 11/1992 | Laufer | |
| 5,165,778 A | 11/1992 | Matthias | |
| 5,211,469 A | 5/1993 | Matthias | |
| 5,293,839 A | 3/1994 | Jorgensen | |
| 5,353,746 A | 10/1994 | Del Rosario | |
| 5,713,303 A | 2/1998 | Willinsky | |
| 5,778,823 A | 7/1998 | Adey et al. | |
| 5,848,837 A | 12/1998 | Gustafson | |
| 5,850,806 A | 12/1998 | Mark et al. | |
| 5,882,514 A | 3/1999 | Fletcher | |
| 5,937,791 A | 8/1999 | Baugher et al. | |
| 6,030,108 A | 2/2000 | Ishiharada et al. | |
| 6,044,798 A | 4/2000 | Foster | |
| 6,192,833 B1 | 2/2001 | Brune et al. | |
| 6,203,170 B1 | 3/2001 | Patrick | |
| 6,280,078 B1 | 8/2001 | Lewis | |
| 6,347,908 B1 | 2/2002 | Safwat | |
| 6,361,192 B1 | 3/2002 | Fussell et al. | |
| 6,421,952 B1 | 7/2002 | Vascocu | |
| 6,447,681 B1 | 9/2002 | Carlberg et al. | |
| 6,564,747 B2 | 5/2003 | Harris | |
| 6,743,365 B1 | 6/2004 | Marlowe | |
| 6,851,387 B2 | 2/2005 | Untermeyer et al. | |
| 7,195,368 B2 | 3/2007 | Heath | |
| 7,220,018 B2 | 5/2007 | Crabb et al. | |
| 7,287,488 B2 | 10/2007 | Taylor et al. | |
| 7,500,776 B1 | 3/2009 | Buczko | |
| 7,800,119 B2 | 9/2010 | He et al. | |
| 7,845,814 B2 | 12/2010 | Crabb et al. | |
| 7,878,674 B2 | 2/2011 | Crabb et al. | |
| 7,906,793 B2 | 3/2011 | Negley | |
| 8,006,646 B2 | 8/2011 | Grad | |
| 8,057,060 B2 * | 11/2011 | Fredricks | A01K 63/06 362/101 |
| 8,100,560 B2 | 1/2012 | Ahland et al. | |
| 8,111,001 B2 | 2/2012 | Underwood et al. | |
| 8,230,815 B2 | 7/2012 | Fredricks | |
| 8,373,363 B2 | 2/2013 | Grajcar | |
| 8,531,136 B2 | 9/2013 | Grajcar | |
| 8,568,009 B2 * | 10/2013 | Chiang | A01K 63/06 362/1 |
| 8,593,044 B2 | 11/2013 | Grajcar | |
| 8,643,308 B2 | 2/2014 | Grajcar | |
| 8,950,361 B1 | 2/2015 | Pierce | |
| 9,016,240 B2 | 4/2015 | Delabbio | |
| 2001/0045189 A1 | 11/2001 | McNeil | |
| 2002/0191396 A1 | 12/2002 | Reiff | |
| 2003/0222503 A1 | 12/2003 | Lam et al. | |
| 2004/0107914 A1 | 6/2004 | Untermeyer et al. | |
| 2005/0029178 A1 | 2/2005 | Haddas | |
| 2005/0120970 A1 | 6/2005 | Massingill et al. | |
| 2005/0128751 A1 | 6/2005 | Roberge et al. | |
| 2005/0135104 A1 | 6/2005 | Crabb et al. | |
| 2005/0224010 A1 | 10/2005 | Nakayama | |
| 2005/0232766 A1 | 10/2005 | Tsai | |
| 2005/0236998 A1 | 10/2005 | Mueller et al. | |
| 2006/0271340 A1 * | 11/2006 | Levine | A01K 63/06 702/188 |
| 2007/0069663 A1 | 3/2007 | Burdalski et al. | |
| 2007/0159833 A1 | 7/2007 | Netzel et al. | |
| 2007/0176182 A1 | 8/2007 | Wen et al. | |
| 2007/0268693 A1 | 11/2007 | Thomas et al. | |
| 2007/0268702 A1 | 11/2007 | McFadden | |
| 2007/0297906 A1 | 12/2007 | Wu | |
| 2008/0173249 A1 | 7/2008 | Miller | |
| 2008/0217225 A1 | 9/2008 | Allis | |
| 2008/0273331 A1 | 11/2008 | Moss et al. | |
| 2009/0050067 A1 | 2/2009 | Parsons et al. | |
| 2009/0080187 A1 | 3/2009 | Chou | |
| 2009/0140668 A1 | 6/2009 | Crabb et al. | |
| 2010/0005711 A1 | 1/2010 | McNeff | |
| 2010/0267126 A1 | 1/2010 | Jacobs et al. | |
| 2010/0045198 A1 | 2/2010 | Lee et al. | |
| 2010/0081835 A1 | 4/2010 | Wu et al. | |
| 2010/0236137 A1 | 9/2010 | Wu et al. | |
| 2010/0239441 A1 | 9/2010 | Bade et al. | |
| 2010/0268390 A1 | 10/2010 | Anderson | |
| 2011/0012157 A1 | 1/2011 | Shi | |
| 2011/0045564 A1 | 2/2011 | Dhamwichukorn | |
| 2011/0078949 A1 | 4/2011 | Schuster et al. | |
| 2011/0089830 A1 | 4/2011 | Pickard et al. | |
| 2011/0101410 A1 | 5/2011 | Lin et al. | |
| 2011/0109244 A1 | 5/2011 | Grajcar | |
| 2011/0122645 A1 | 5/2011 | Donham et al. | |
| 2011/0209400 A1 | 9/2011 | Rooymans | |
| 2011/0210678 A1 | 9/2011 | Grajcar | |
| 2011/0253056 A1 | 10/2011 | Fredricks | |
| 2011/0273098 A1 | 11/2011 | Grajcar | |
| 2011/0279015 A1 | 11/2011 | Negley et al. | |
| 2011/0280011 A1 | 11/2011 | Crabb et al. | |
| 2011/0291135 A1 | 12/2011 | Hsieh et al. | |

(56) References Cited

U.S. PATENT DOCUMENTS

| | | |
|---|---|---|
| 2011/0303927 A1 | 12/2011 | Sanpei et al. |
| 2011/0316014 A1 | 12/2011 | Hiroyuki |
| 2011/0316420 A1 | 12/2011 | Chang et al. |
| 2011/0317416 A1 | 12/2011 | Oyaizu et al. |
| 2012/0013238 A1 | 1/2012 | Jonsson |
| 2012/0040449 A1 | 2/2012 | Zambaux |
| 2012/0044713 A1* | 2/2012 | Chiang ............... A01K 63/06 362/554 |
| 2012/0060763 A1 | 3/2012 | Lin |
| 2012/0098458 A1 | 4/2012 | Dai et al. |
| 2012/0117869 A1 | 5/2012 | Javan et al. |
| 2012/0129245 A1 | 5/2012 | Neeb et al. |
| 2012/0149091 A1 | 6/2012 | Wilkerson et al. |
| 2012/0212129 A9 | 8/2012 | Chou et al. |
| 2012/0268918 A1 | 10/2012 | Grajcar |
| 2012/0312243 A1 | 12/2012 | Rusch |
| 2013/0027947 A1 | 1/2013 | Villard et al. |
| 2013/0058103 A1 | 3/2013 | Jiang et al. |
| 2013/0118414 A1 | 5/2013 | Komada et al. |
| 2013/0152864 A1 | 6/2013 | Grajcar |
| 2013/0174792 A1 | 7/2013 | Delabbio |
| 2013/0220940 A1 | 8/2013 | Galletta, Jr. |
| 2013/0220944 A1 | 8/2013 | Galletta, Jr. |
| 2013/0333627 A1 | 12/2013 | Pohl |
| 2015/0150195 A1 | 6/2015 | Grajcar |
| 2015/0237890 A1 | 8/2015 | Grajcar |
| 2016/0021855 A1* | 1/2016 | Grajcar ............... A01K 61/00 362/249.02 |
| 2016/0037756 A1 | 2/2016 | Grajcar et al. |
| 2016/0317989 A1 | 11/2016 | Nagler |
| 2017/0049082 A1 | 2/2017 | Kim |
| 2017/0086430 A1* | 3/2017 | Wills ..................... A23K 50/60 |
| 2017/0094756 A1* | 3/2017 | Saffari ............... H05B 37/0272 |

FOREIGN PATENT DOCUMENTS

| | | |
|---|---|---|
| CN | 1280764 | 1/2001 |
| CN | 2699664 | 5/2005 |
| CN | 1692700 | 11/2005 |
| CN | 201344401 | 11/2009 |
| CN | 101868529 | 10/2010 |
| CN | 201944685 | 8/2011 |
| EP | 1508272 | 2/2005 |
| EP | 1610593 | 12/2005 |
| EP | 2284440 | 2/2011 |
| JP | S6268591 | 3/1987 |
| JP | 2002143856 | 5/2002 |
| JP | 2005111378 | 4/2005 |
| JP | 4241870 | 3/2009 |
| JP | 2011134903 | 7/2011 |
| JP | 4796027 | 10/2011 |

OTHER PUBLICATIONS

International Application Serial No. PCT/US2012/069379, Written Opinion dated Feb. 25, 2013, 9 pgs.
International Application Serial No. PCT/US2012/069379 Preliminary Report on Patentability dated Jun. 17, 2014 10 pgs.
International Application Serial No. PCT/US2012/069728 Preliminary Report on Patentability dated Jun. 17, 2014, 5 pgs.
International Application Serial No. PCT/US2012/068701 Preliminary Report on Patentability dated Jun. 26, 2014, 5 pgs.
International Patent Application Serial No. PCT/US2012/068701 International Search Report dated Dec. 10, 2012, 2 pgs.
International Patent Application Serial No. PCT/US2012/068701 Written Opinion dated Dec. 10, 2012, 4 pgs.
International Application Serial No. PCT/US2014/041331, International Preliminary Report on Patentability dated Dec. 17, 2015, 5 pgs.
International Application Serial No. PCT/US2014/041331, International Search Report dated Oct. 16, 2014, 3 pgs.
International Application Serial No. PCT/US2014/041331, Written Opinion dated Oct. 16, 2014, 4 pgs.
International Application Serial No. PCT/US2013/058511, International Preliminary Report on Patentability dated Mar. 19, 2015, 6 pgs.
International Application Serial No. PCT/US2013/058511, International Search Report dated Dec. 4, 2013, 3 pgs.
International Application Serial No. PCT/US2013/058511, Written Opinion dated Dec. 4, 2013, 5 pgs.
Chinese Application Serial No. 201280070124.6 Office Action, dated May 18, 2015, with English translation, 15 pgs.
Global Dossier Translation Chinese Application CN201280067879 2nd Office Action dated Nov. 9, 2015, 7 pgs.
Global Dossier Translation of 2nd Office Action Chinese Application Serial No. 201280070124.6, dated Jan. 18, 2016, 15 pgs.
Hongshan Su: "Fish Culture in Light Net Pen Underwater" (title also translated as "Test of Fish Farming in Underwater Lighting Cage"), Journal of Zoology, vol. 2, 1983, pp. 31-32, with English translation, 4 pgs.
McConnaughy, Janet; Researcher Uses Light to Grow Bigger Crawfish http://www.dailycomet.com/article/20110706/WIRE/110709753?template=printpicart, Jul. 31, 2014., 3 pgs.

* cited by examiner

LIGHTING SYSTEM AND CONTROL FOR AQUACULTURE

CROSS REFERENCE

This application is a continuation of U.S. patent Ser. No. 14/820,588 entitled Lighting System and Control for Experimenting in Aquaculture, to Grajcar et al. and filed Aug. 7, 2015 that claims benefit to U.S. Provisional Patent Application Ser. No. 62/034,490 filed Aug. 7, 2014 entitled. Lighting System and Control For Experimenting in Aquaculture to Grajcar et al. and that application is incorporated by reference in full.

BACKGROUND

This invention is related to LED Lighting Assemblies. More specifically, this invention relates to an LED lighting system and control system for use when experimenting in indoor or covered aquaculture units.

Lighting can be used to affect the physiology of aquatic animals. Specifically, light is needed for growth of most animal species and can substantially affects the animals' feeding, reproduction, and location in the water column, among other processes. Further, studies have shown that different living organisms are both behaviorally and psychologically affected by light and in particular the wavelength of light they receive. This holds true whether the living organism is a plant or animal as is discussed in several patents by the present, inventor, including provisional patent application No. 61/669,825 entitled Light Sources Adapted to Spectral Sensitivity of Plants to Grajcar and 61/698,074 entitled Aquatic System for Manipulating Psychological and Physiological Effects in Aquatic Life to Grajcar, both that are incorporated in full herein.

In addition, in the field of aquaculture as issues with pollution and transportation costs continue to rise outdoor aquaculture facilities are starting to have significant drawbacks. In particular there is a desire in the aquaculture industry to have indoor aquaculture facilities. For example, in Las Vegas, several in an attempt to reduce transportation cost and to ensure the freshest ingredients some restaurants receive their fish, lobster, shrimp, etc. from local indoor aquaculture facilities.

One of the main differences between indoor aquaculture and covered units and outdoor aquaculture is the use of artificial lighting as opposed to use of the sun for light. In particular artificial lighting does not provide the same spectrum or wavelength as the sun where many living organisms have both psychological and physiological responses to certain wavelengths as discussed above. As a result of this, companies and universities alike are doing experiments on not just indoor aquaculture, but also the effect of artificial lighting, including in the tank and underwater lighting.

A problem exists at these facilities however, in that the artificial lighting in these facilities themselves effect test results. Specifically, with workers turning artificial lighting on and off and the suddenness of lighting that goes on and off is not natural in nature and is typically shown as presenting a negative effect on the aquatic animal. Similarly, the amount of secondary lighting from artificial lighting also effects experiments and makes repeatability of experiments difficult at best, thus minimizing scientific relevance of results. Thus, a need in the art exists for lighting products that minimize variations and effects of artificial lighting for workers on experiments and lighting within an experiment in an indoor or covered unit.

Thus a principle object of the present invention is to provide a lighting method that minimizes the effect of lighting on aquatic life;

Another object of the present invention is to provide a cost effective lighting system that reduces stress of aquatic life.

These and other objects, advantages and features will become apparent from the specification and claims.

SUMMARY OF THE INVENTION

A method of experimenting on aquatic life in an indoor facility by proving a lighting system that emits uniform lighting across a containment unit. The uniform lighting is provided at the air and water interface within the containment unit. In addition the light emitted is at a predetermined wavelength that does not penetrate the surface of the water to illuminate the aquatic life and gradually turned on and off. In this manner the aquatic life within the containment unit is least effected by the above the water lighting to ensure results of experiments are not skewed.

DETAILED DESCRIPTION OF THE DRAWINGS

DETAILED DESCRIPTION OF A PREFERRED EMBODIMENT OF THE INVENTION

Figure 1:
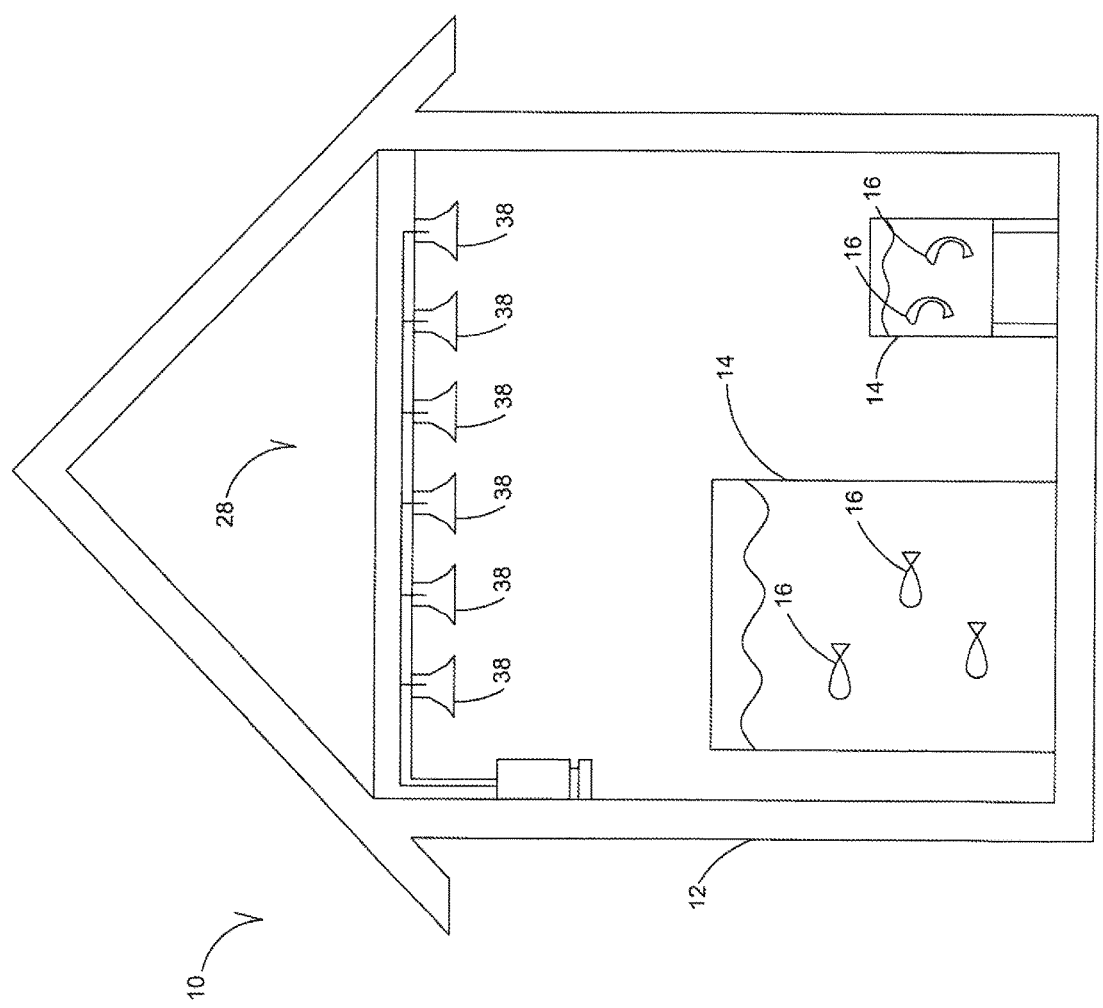
FIG. 1 is a side plan view of an aquaculture facility.
Figure 2:
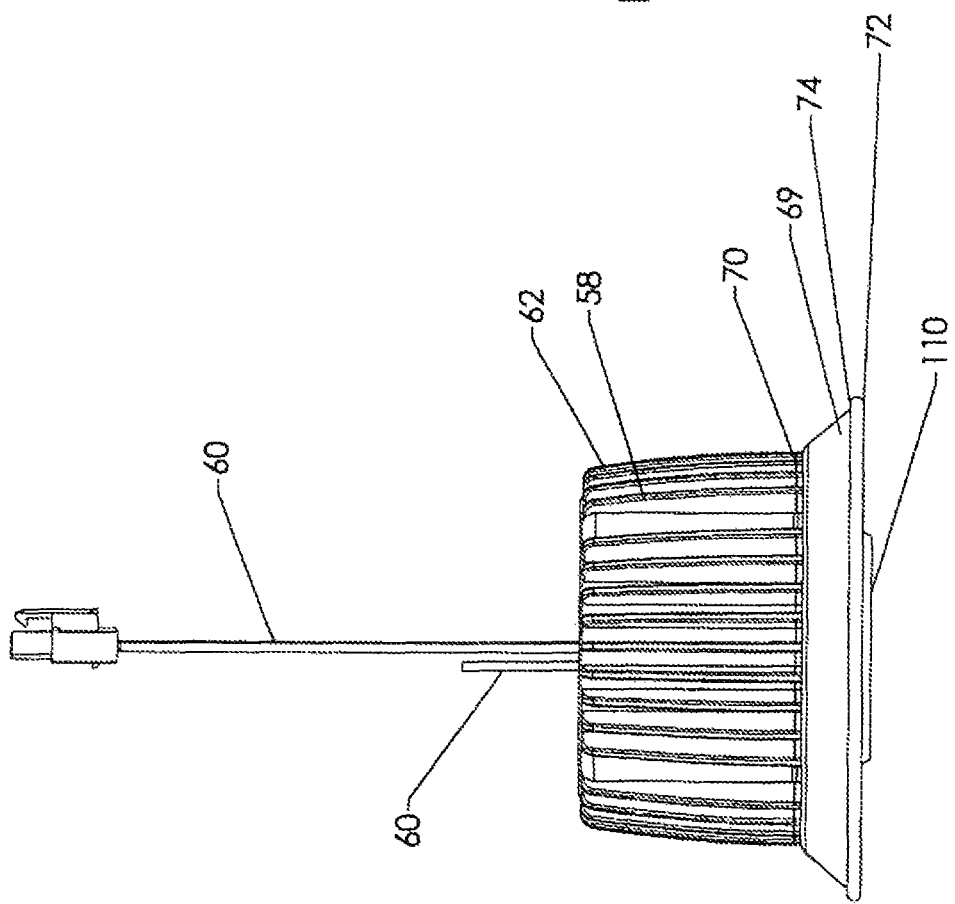
FIG. 2 is a side plan view of a lighting device of a lighting system.
Figure 3:
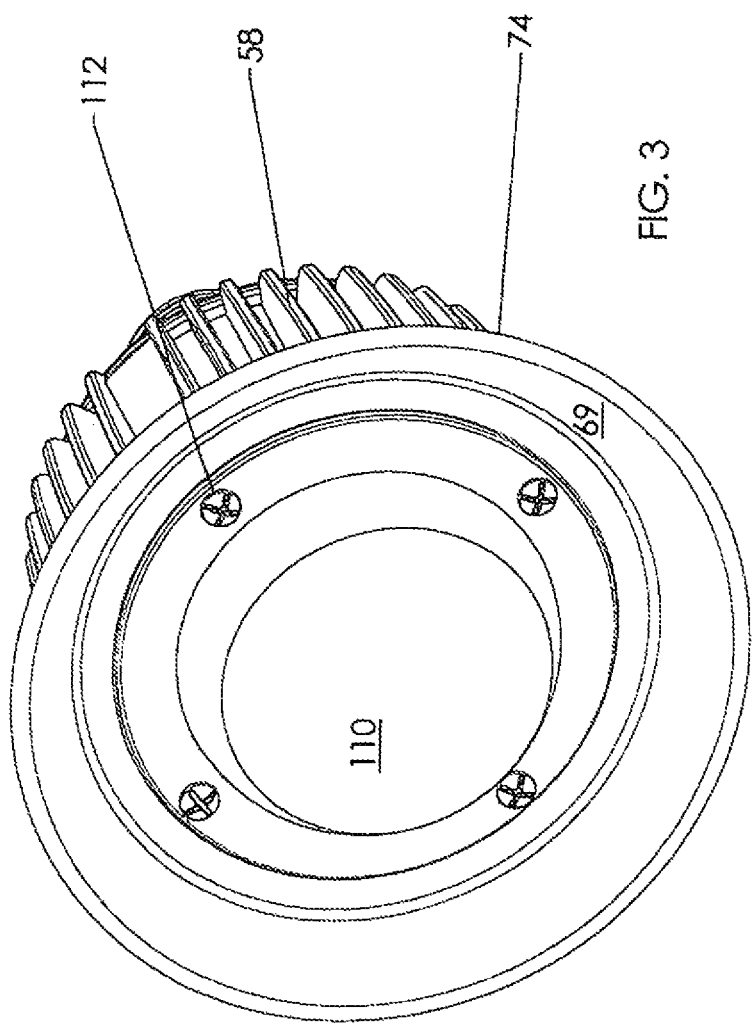
FIG. 3 is a side perspective view of a lighting device of a lighting system.

The figures show an indoor rearing facility 10 that includes a dwelling 12 such as a building. The dwelling 12 either has a plurality of containment units 14 such as tanks, pools and the like for housing aquatic life 16 or the dwelling 12 can be a singular covered unit 17 filled with water that houses the aquatic life 16.

The figure also shows a lighting system 28 that in one embodiment includes a plurality of electrical conduit bodies 30 that receive and electrical input from an electrical source 32. The electrical conduit bodies 30 house wiring 34 that extend to provide an electric excitation signal to different areas in the dwelling. In one embodiment the wiring is electrically connected to a socket 36 to receive a lighting assembly 38.

Alternatively, any style of power source, including but not limited to Edison bases, junction boxes, hanging assemblies or the like can be presented without falling outside of the present disclosure and the disclosure is not considered limited. In one embodiment the lighting system 28 incorporates a junction box that is water resistant or water proof, depending on the requirements of the location of the system. This water resistance is an important feature of the system, allowing application in areas where there is significant humidity and accidental contact with water. In another embodiment the light is secured to the apex of a roof 39, in a junction box or otherwise, to evenly distribute light.

The lighting assembly 38 includes a base 40 having electrical conducting elements 42 therein that threadably and electrically connects within the socket 36 as is known in the art. The base 40 is either threadably received or compression fit onto a frustroconally shaped body 44 having a hollow interior 46 and a sidewall 48 that extends outwardly and away from a first end 50 having a first diameter to a second end 52 having a second diameter greater than the first diameter. In this manner when waste or feces or water is sprayed on the body 44 the material flows downwardly and off the assembly 38. At the second end is a ring element 54 that is of size and shape to engage a sealing element 56 that in a preferred embodiment is made from an elastic material that expands upon compression. The sealing element 56 is secured between the ring element 54 and heat sink 58 to provide a water tight seal therebetween. In this manner electrical wiring 60 is electrically connected to the conductive body through the body 44 and heat sink within a water tight assembly 38.

In an alternative embodiment a socket 36 is not presented and instead the wiring is directly provided. In this embodiment the body 44 with the base 40 are not provided and instead the electrical wiring 60 disposed through the heat sink is directly or hard wired to the wiring 34 of the conduit to provide a direct electrical connection. The heat sink is then threadably and/or sealing connected to the conduit again to provide a water tight seal to prevent water from being within the interior of the heat sink 58 and being exposed to the electrical wiring 60.

The heat sink 58 in a preferred embodiment is made of a plastic material and has a plurality of fin elements 62 that assist in conveying heat through the sink 58. The heat sink 58 extends from a first end 64 adjacent the conduit bodies 30 that receives the sealing element 56 in one embodiment and is sealed to a conduit body 30 in another to second end 66. The second end 66 is secured to a diffusion element 68 that has a frustroconical shape having a sidewall 69 that extends from a first end 70 outwardly and downwardly from the heat sink 58 to an open second end 72 having a diameter slightly greater than the diameter of the first end 70 and terminating in a lip element 74. By being sloped at an angle and downwardly, again, water, feces and other materials often known to swine facilities 10 flow off the diffusion element 68, yet the lip element 74 keeps a robust design to withstand the harsh environment.

Figure 4:
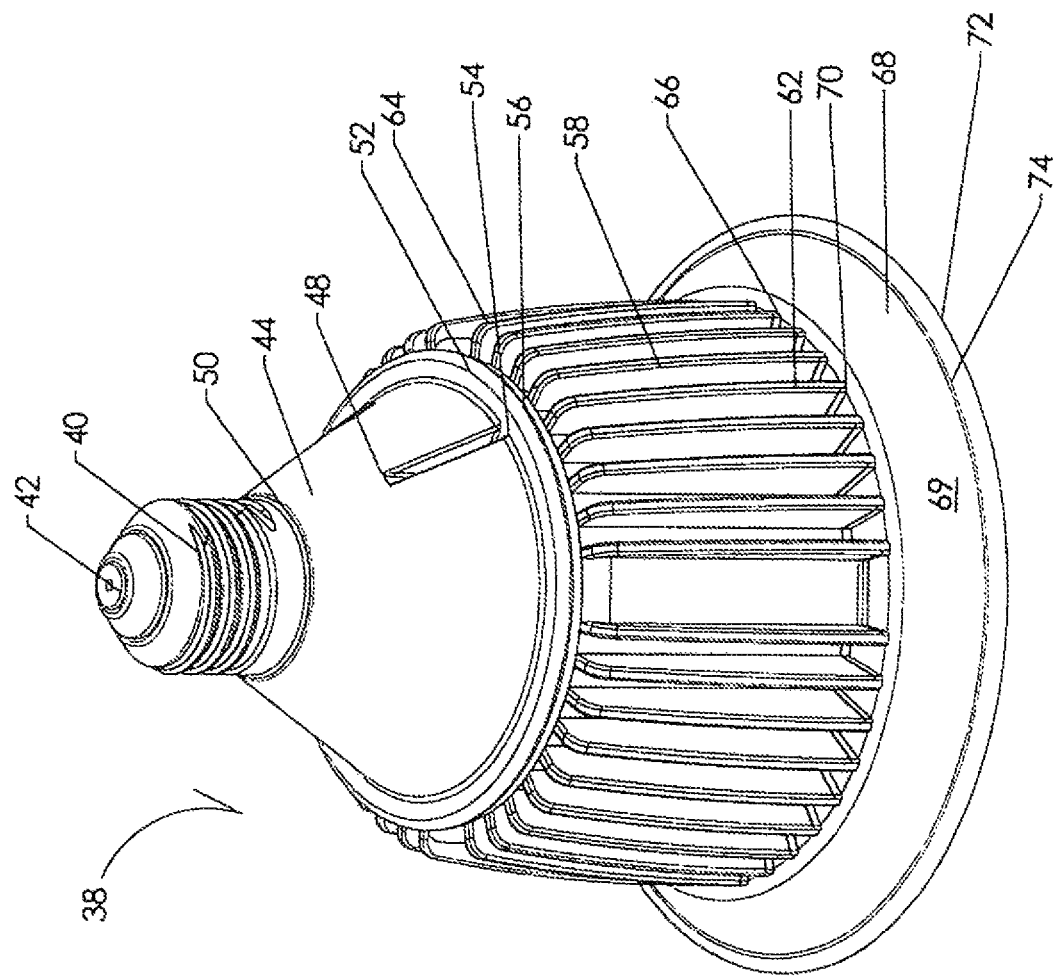
FIG. 4 is a top perspective view of a lighting device of a lighting system.
Figure 5:
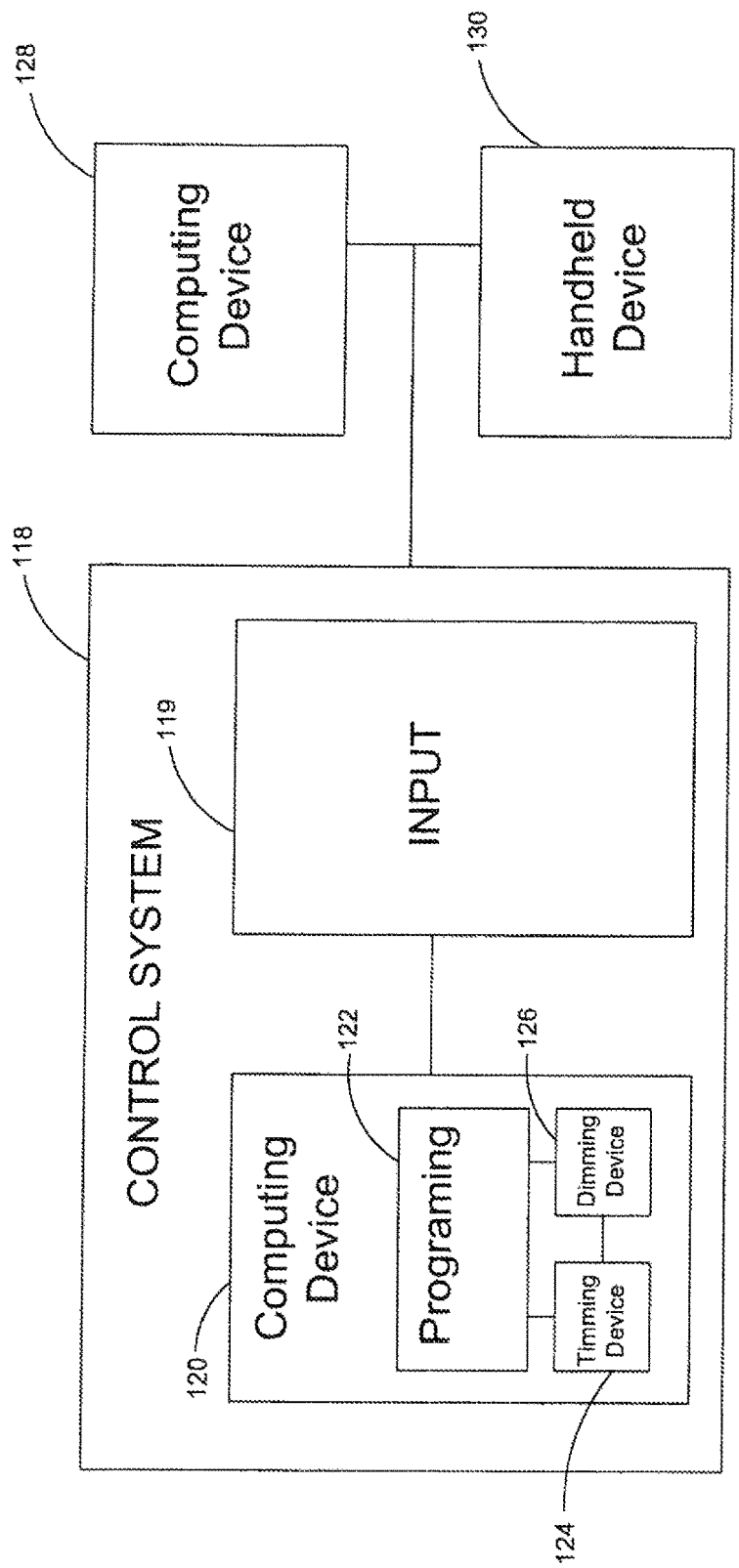
FIG. 5 is a schematic diagram of a control system for a lighting system.
Figure 6:
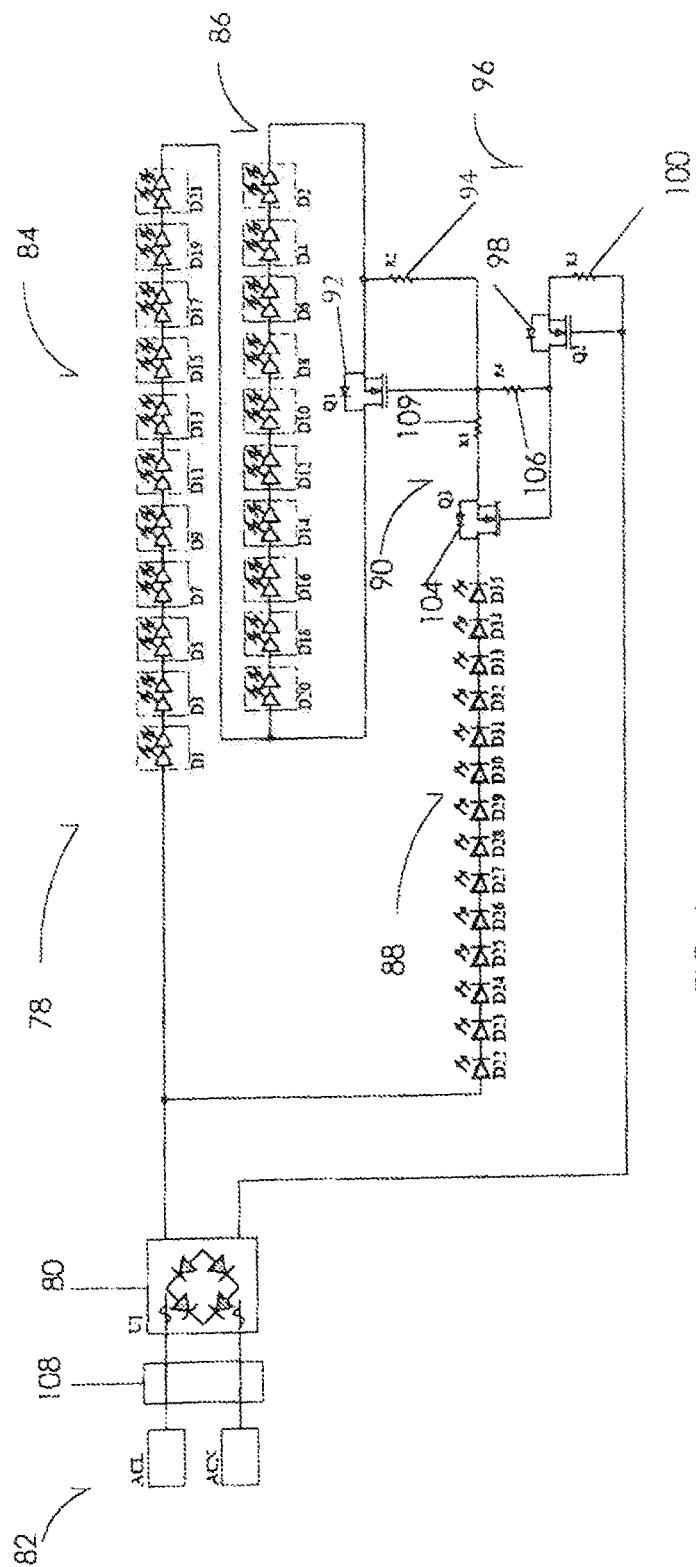
FIG. 6 is a schematic diagram of circuitry of a lighting system.
Figure 7:
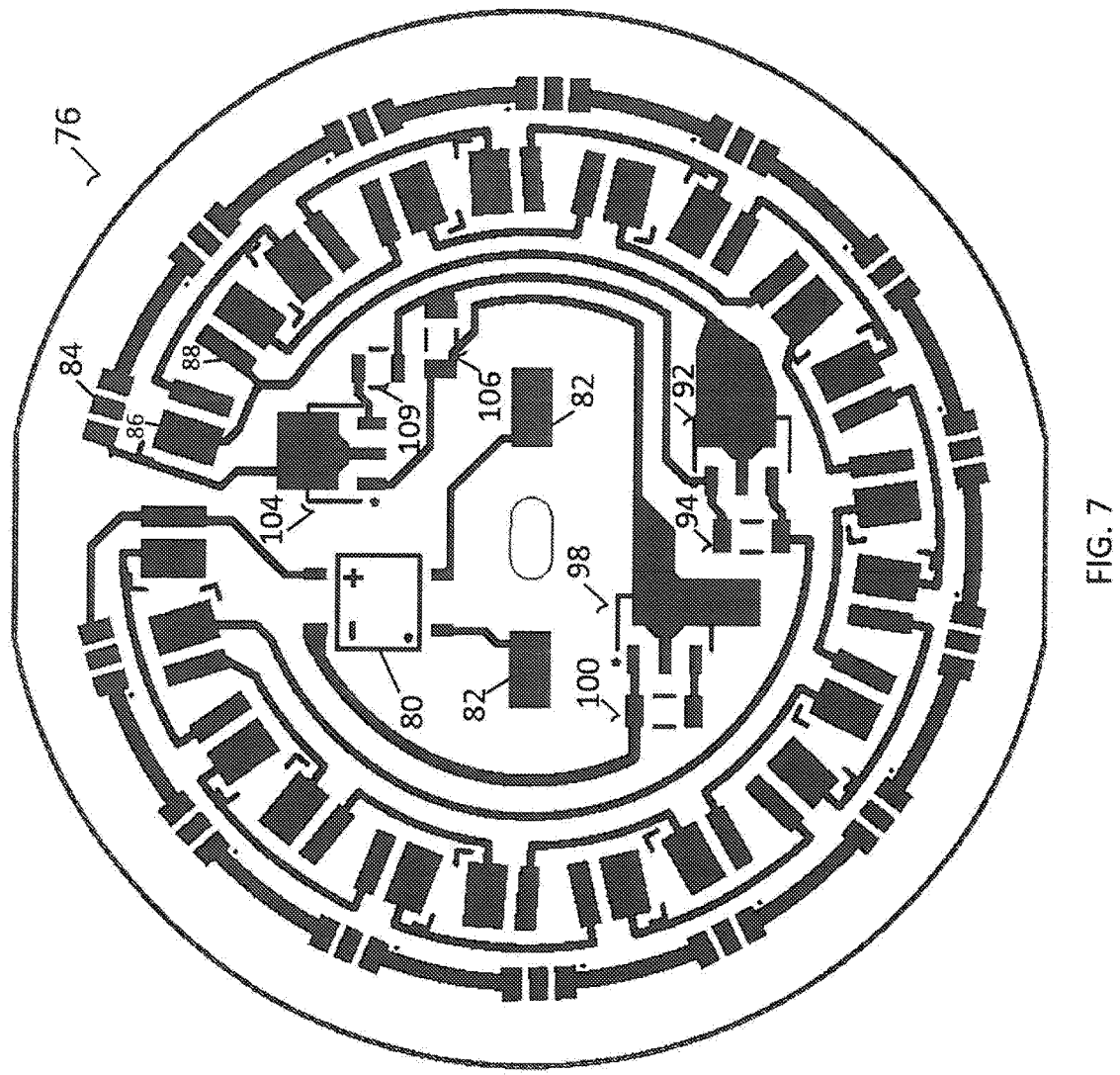
FIG. 7 is a top plan view of a substrate with circuitry of a lighting device of a lighting system.

A substrate 76 is also secured to the second end 66 of the heat sink 58 and in one embodiment has a generally round shape. The substrate also in one embodiment is a printed circuit board. FIG. 4 shows the substrate 76 having driving circuitry 78. The circuitry is similar to that taught in U.S. Pat. No. 8,373,363 entitled Reduction of Harmonic Distortion for LED Loads, by Z. Grajcar and issued on Feb. 12, 2013 and U.S. patent application entitled "Color Temperature Shift Control for Dimmable AC LED Lighting," Ser. No. 12/824,215, which was filed by Z. Grajcar on Jun. 27, 2010, the entire contents of each of which are incorporated herein by reference.

The circuitry 78 of the present invention includes a rectifying device 80 that receives current from an AC source 82 and includes a first group of light emitting diodes 84 arranged in series with a second group of light emitting diodes 86, both of which comprise diodes emitting white light. A third group of light emitting diodes 88 comprising diodes emitting red light are presented in parallel to the first and second groups of diodes 84 and 86. Red light emitted is considered any light having a wavelength approximately between 620 nm and 780 nm. Alternatively light emitting diodes having providing blue light, or having a wavelength approximately between 400 nm and 500 nm could be used without falling outside the scope of this invention. A bypass path 90 is presented with a first impedance element 92, that in one embodiment is a transistor. In a Preferred embodiment the first impedance element 92 is a depletion MOSFET, though a p-channel MOSFET, n-channel MOSFET or the like can be used without falling outside the scope of this disclosure, even if an additional transistor is required for functionality purposes. A first resistor 94 is also provided to control the flow of current through the first impedance element 92 to provide smooth and continuous current flow.

A second bypass path 96 is also provided with a second impedance element 98 that similarly in one embodiment is a depletion MOSFET. Similar to the first bypass path 90 the second bypass path 96 utilizes a second resistor 100 again to control the impedance element 98. Similarly also, a third bypass path 102 is provided between the third group of light emitting diodes 88 and first and second groups of light emitting diodes 84 and 86. Again, this bypass path 102 utilizes a third impedance element 104 and third resistor 106 to provide similar functionality as the other bypass paths. In this manner when a dimming device 108 is electrically connected to the circuit and the voltage begins dropping, current flow to the first group of diodes 84 drops first, dimming out the first group of white diodes. Then as dimming continues and a threshold current is reached the second group of light emitting diodes 86 begin to dim. Thus, again white light is slowly dimmed and eliminated from the output light. In this manner only the third group of light emitting diodes 88 that are red remain providing light. A supplemental resistor 109 optionally is provided to limit current in the system and to improve efficiencies.

A lens element 110 is secured to the heat sink 58, diffusion element 68 or both. In one embodiment fastening elements 112 are utilized to provide the connection. In particular the lens element 110 is secured to provide a water tight seal so that water cannot encroach the interior of the assembly 38.

In addition the LEDs 86 are spaced equidistant about the substrate 76 to provide even or uniform directional lighting. Specifically, light emitted from the diodes equally present the same lumen output such that lighting assemblies 38 can be spaced equidistant to ensure even and uniform lighting throughout a dwelling and onto the tanks 14 housing the aquatic life. In singular covered units 17, the lighting assembly 38 or assemblies 38 are placed so that there is even illumination (lux) on the surface area of the air/water interface and at the substrate area of the unit. In particular the assembly is designed and assembly or assemblies 38 positioned to provide uniform lux at the air/water interface to minimize effect on the aquatic life 16 as a result of lighting changes or inconsistencies.

Consequently, with a programmable dimming device 108 the lighting assembly 38 can provide light throughout a 24 hour period to optimize conditions for experimentation. Specifically, the dimming device 108 can be programmed to gradually turn on at very low intensity levels and gradually over a predetermined time period, such as in one example 2 hours go from darkness to a maximum intensity. Thus, with the uniform lighting and gradual increase of intensity, the lighting assemblies 38 have minimal effect of aquatic life 16 that is being tested within tanks 14. Similarly, at night, when it is time for individuals to leave the dimming device 108 is programmed to gradually decrease lumen intensity until the assemblies 38 no longer emit light. Again, in this manner, in combination with the even or uniform lighting the least amount of change, effect or stimulus on the aquatic life 16 is realize by the aquatic life 16. In this manner test results are unlikely to be skewed by effects of general lighting within a dwelling 12.

A control system 118 is electronically connected to the lighting assemblies 38. The control system 118 includes an input 119 for actuating a computing system 120 having programming 122 therein associated with a timing device 124. The control system 118 additionally has a dimming device 126 that is electrically connected to the timing device 124 such that the programming 122 at predetermined periods will automatically dim the lighting assemblies 38 to a predetermined light setting. The control system 118 in one embodiment communicates remotely through over the air communications, via Wifi or as is known in the art to provide lighting and dimming information to an individual having a remote computing device 128 or handheld device 130 having the capability to receive such communication. In one embodiment the computing device 128 or handheld device 130 may be used to communicate instructions to the control system 118 such that the control system 118 is remotely controlled by the remote device 128 or 130. Examples of the remote devices include but are not limited to computers, laptop computers, tablets, IPads, smartphones, blackberries, remote controls and the like.

The dimming process of the lighting system is designed to afford maximum variability in intensity with very little variation in spectral output. Particularly the spectrum of this lighting system is designed so that dimming of the light does not change the spectral curve and there is an evenness or uniformity of spectral output until the lamp is dimmed to 5% output. At the dimming level of 5% the spectral output becomes Predominantly red light or approximately between 630 nm and 750 nm. Specifically red light is the light spectrum that has the lowest level of penetration in water compared to the other visible spectral wavelength, thus again minimizing the effect on the aquatic life 16 the dwelling while providing lighting output for humans or workers within the facility 10. Thus this low lumen level (less than 100 lumens) red light affords an illuminance that is of minimum effect on organisms in the water.

In operation a plurality of light assemblies 38 are installed into a facility 10 and electrically connected to a dimming device 108 having a programmable timer. The assembly is connected within the barn either directly or the body 44 can be attached to provide a retro fit if needed instead of a hard wire connection. In this manner the assembly 38 is modular in design. The programmable timer can then be programmed to provide gradual increases and decreases of lighting at specific times to minimize unnecessary stimuli on the aquatic life 16.

When wash down of the facilities 10 is required the assemblies 38 are sprayed with water from a power washer, hose or other water supply. The water then envelopes any dirt, dust, feces or other containments and the frustroconical sections of the assembly 38 allow for easy removal of the containments keeping the assembly 38 and facility clean and sanitary. Because of the water tight seals water does not enter the interior of the assembly 38 again ensuring long life of the assembly 38. Thus, at the very least, all of the stated problems have been overcome.

What is claimed:

1. A system for supporting aquatic life, comprising
    a containment unit for housing aquatic life having an air space, water, and an air/water interface;
    a lighting assembly having at least one light source wherein the lighting assembly is placed in the air space to provide lighting at the air/water interface;
    a programmable dimming device electrically connected to the lighting assembly wherein the dimming device gradually increases the intensity of the light over first a predetermined period of time and wherein the dimming device gradually decreases the intensity of the light over a second predetermined period of time;
    wherein when the intensity of the light source is reduced to 5% of the spectral output the light source emits predominately red light.

2. The system of claim 1 wherein the light source is at least one light emitting diode.

3. The system of claim 2 wherein the lighting assembly has at least one first light emitting diode and at least one second light emitting diode.

4. The system of claim 3 wherein the first light emitting diode emits white light.

5. The system of claim 3 wherein the second light emitting diode emits red light.

6. The system of claim 5 wherein the red light has a wavelength between 620 nm and 780 nm.

7. The system of claim 3 wherein the second light emitting diode emits blue light.

8. They system of claim 7 wherein the blue light has a wavelength of between 400 nm and 500 nm.

9. The system of claim 2 wherein the at least one light emitting diode emits light at a predetermined wavelength to reduce the penetration of light into the water of the containment unit.

10. The system of claim 9 wherein the predetermined wavelength is in a range between 630 nm and 750 nm.

11. The system of claim 1 wherein the first predetermined period of time is two hours.

12. The system of claim 1 wherein the second predetermined period of time is two hours.

13. A system for supporting aquatic life, comprising
    a containment unit for housing aquatic life having an air space, water, and an air/water interface;
    a lighting assembly having at least one first light emitting diode wherein the lighting assembly is placed in the air pace to provide lighting at the air/water interface
    a programmable dimming device electrically connected to the lighting assembly wherein the dimming device gradually decreases the intensity of the light over a predetermined period of time;
    wherein the first light emitting diode emits white light; and
    wherein the first light emitting diode emits white light until the dimming device reduces the emitted light to a level of 5% of the spectral output wherein further dimming causes the first light emitting diode to emit red light.

14. The system of claim 13 wherein the lighting assembly further includes at least one second light emitting diode.

15. The system of claim 14 wherein the second light emitting diode emits either blue or red light.

16. A system for supporting aquatic life, comprising
    a containment unit for housing aquatic life having an air space, water, and an air/water interface;
    a lighting assembly having at least one first light emitting diode wherein the lit assembly is placed in the air space to provide lighting at the air/water interface
    a programmable dimming device electrically connected to the lighting assembly wherein the dimming device gradually decreases the intensity of the light over a predetermined period of time wherein the dimming device gradually increases the intensity of the first light emitting diode over a second predetermined period of time.

17. The system of claim 16 wherein the lighting assembly further includes at least one second light emitting diode.

18. The system of claim 17 wherein the second light emitting diode emits either blue or red light.

* * * * *